United States Patent [19]

Tanaka

[11] Patent Number: 4,673,823
[45] Date of Patent: Jun. 16, 1987

[54] APPARATUS FOR OPERATING CYCLOCONVERTERS IN PARALLEL FASHION

[75] Inventor: Shigeru Tanaka, Tama, Japan

[73] Assignee: E. I. Du Pont de Nemours and Company, Wilmington, Del.

[21] Appl. No.: 813,879

[22] Filed: Dec. 27, 1985

[30] Foreign Application Priority Data

Dec. 28, 1984 [JP] Japan .................. 59-274716
Jul. 31, 1985 [JP] Japan .................. 60-167714

[51] Int. Cl.$^4$ ............................................. H02P 13/30
[52] U.S. Cl. ........................................ 307/11; 307/87; 363/10; 363/160; 318/801
[58] Field of Search ............... 307/6, 11, 82, 83, 87; 318/800, 801, 802, 803, 817; 363/10, 159, 160, 161, 162; 323/207

[56] References Cited

U.S. PATENT DOCUMENTS

| | | | |
|---|---|---|---|
| 3,678,369 | 7/1972 | Splatt ........................... | 363/161 |
| 3,858,105 | 12/1974 | Gyugyi ......................... | 363/160 |
| 3,908,132 | 9/1975 | Krampe et al. ............... | 307/87 |
| 3,942,089 | 3/1976 | Kanngiesser ................. | 307/82 X |
| 4,013,937 | 3/1977 | Pelly et al. ................... | 363/10 |
| 4,245,295 | 1/1981 | Gotz et al. .................... | 363/160 X |
| 4,270,165 | 5/1981 | Carpenter et al. ........... | 307/82 X |
| 4,281,371 | 7/1981 | Baker ............................ | 363/10 |
| 4,328,429 | 5/1982 | Kublick ........................ | 307/82 X |
| 4,363,101 | 12/1982 | Czerniejewski .............. | 307/35 X |
| 4,418,380 | 11/1983 | Tanaka et al. ................ | 363/10 |
| 4,441,032 | 4/1984 | Sakurai et al. ............... | 307/82 |
| 4,529,925 | 7/1985 | Tanaka et al. ................ | 323/207 |
| 4,570,214 | 2/1986 | Tanaka .......................... | 363/160 |

FOREIGN PATENT DOCUMENTS 59-14988  4/1984  Japan .

Primary Examiner—William M. Shoop, Jr.
Assistant Examiner—Shik Luen Paul Ip

[57] ABSTRACT

Power is fed to a plurality of loads by a respective plurality of circulating current type cycloconverters connected to an ac power supply. A power compensating capacitor common to the cycloconverters is provided at the ac power receiving-end to deliver a leading reactive power to the ac power supply. Further, each cycloconverter is provided with means for delivering a circulating current and means for delivering a circulating current command value to the circulating current control means. A lagging reactive power corresponding to the leading reactive power by the power factor compensating capacitor is delivered to the ac power supply. The power factor compensating capacitor may be configured so that its capacity is variable by changing the number of stages connected. In addition, the circulating current command value may vary depending upon the peak value of the current flowing in each cycloconverter.

12 Claims, 15 Drawing Figures

APPARATUS FOR OPERATING CYCLOCONVERTERS IN PARALLEL FASHION

BACKGROUND OF THE INVENTION

The present invention relates to an apparatus for operating a plurality of cycloconverters in a parallel fashion.

A cycloconverter is an apparatus to directly convert an ac power having a fixed frequency into an ac power having a different frequency. Such a cycloconverter has been widely used for a variable-voltage variable-frequency power supply for driving an ac motor. Particularly, it has been known that a cycloconverter of the circulating current type can set the upper limit of an output frequency $f_0$ at a high value (an operation is possible at an output frequency about an input frequency $f_1$) as disclosed in the Japanese Patent Publication Tokkaisho No. 60-28772, and the range of applications has been increasingly extended.

To overcome such drawbacks, a system described in the Japanese Patent Publication No. 59-14988 is proposed to connect a power factor compensating capacitor at the receiving-end of a cycloconverter to effect a control such that a lagging reactive power of the cycloconverter and a leading reactive power of the power compensating capacitor are cancelled with each other, thus allowing a power factor of a fundamental wave viewed from a power supply to always be unity.

However, various drawbacks have been pointed out in the art when an apparatus is provided with such a power factor compensating capacitor, or in regard to the relationship between the power factor compensating capacitor and the cycloconverter as understood from the following description.

SUMMARY OF THE INVENTION

With the above in view, an object of the present invention is to provide an apparatus for operating cycloconverters in a parallel fashion, which makes it possible to reduce the capacity of a power factor compensating capacitor to be connected at a receiving end, to improve an operating efficiency at the time of a light load operation, to maintain the characteristics of a cycloconverter of the circulating current type at the time of an overload operation, and to reduce the capacity of the cycloconverter.

To achieve this object, an apparatus according to the present invention is configured to correctively connect a power factor compensating capacitor at a common receiving end of a plurality of cycloconverters of the circulating current type to output circulating current command values to the respective cycloconverter so that a reactive power of the entirety of the apparatus is controlled. It is essential to provide for an optimum value as the capacity of a power factor compensating capacitor in consideration of the overall operating mode. Thus, this allows the capacity of the power factor compensating capacitor to be reduced and eliminates the possibility that unnecessary circulating current will flow in the entire system, enabling an operation with a high efficiency.

Where a sum of lagging reactive powers of the entirety of the cycloconverters exceeds the capacity of the power factor compensating capacitor due to an overload operation, a control is effected to maintain circulating current command values delivered to the respective cycloconverters at a fixed value unequal to zero, thereby making it possible to operate the respective cycloconverters in a manner that they do not lose the characteristics of the cycloconverter of the circulating current type.

Further, where circulating currents are to flow in the respective cycloconverters in a light-load operation, a control is effected to reduce the number of power factor compensating capacitors connected depending upon the magnitude of the circulating current command value, thus making it possible to perform an improvement in operating efficiency.

In addition, where respective cycloconverters are operated in accordance with different operating modes e.g., light-load or overload operating mode, etc., a distributive control is effected to flow a large circulating current in a cycloconverter coupled to the light-load and to flow a small circulating current, thus making it possible to prevent the current capacity of the converters from being increased.

DETAILED DESCRIPTION OF THE INVENTION

Initially, drawbacks with the prior art will be described with reference to FIG. 15, and then preferred embodiments according to the present invention will be described with reference to FIGS. 1 to 14.

Figure 15:
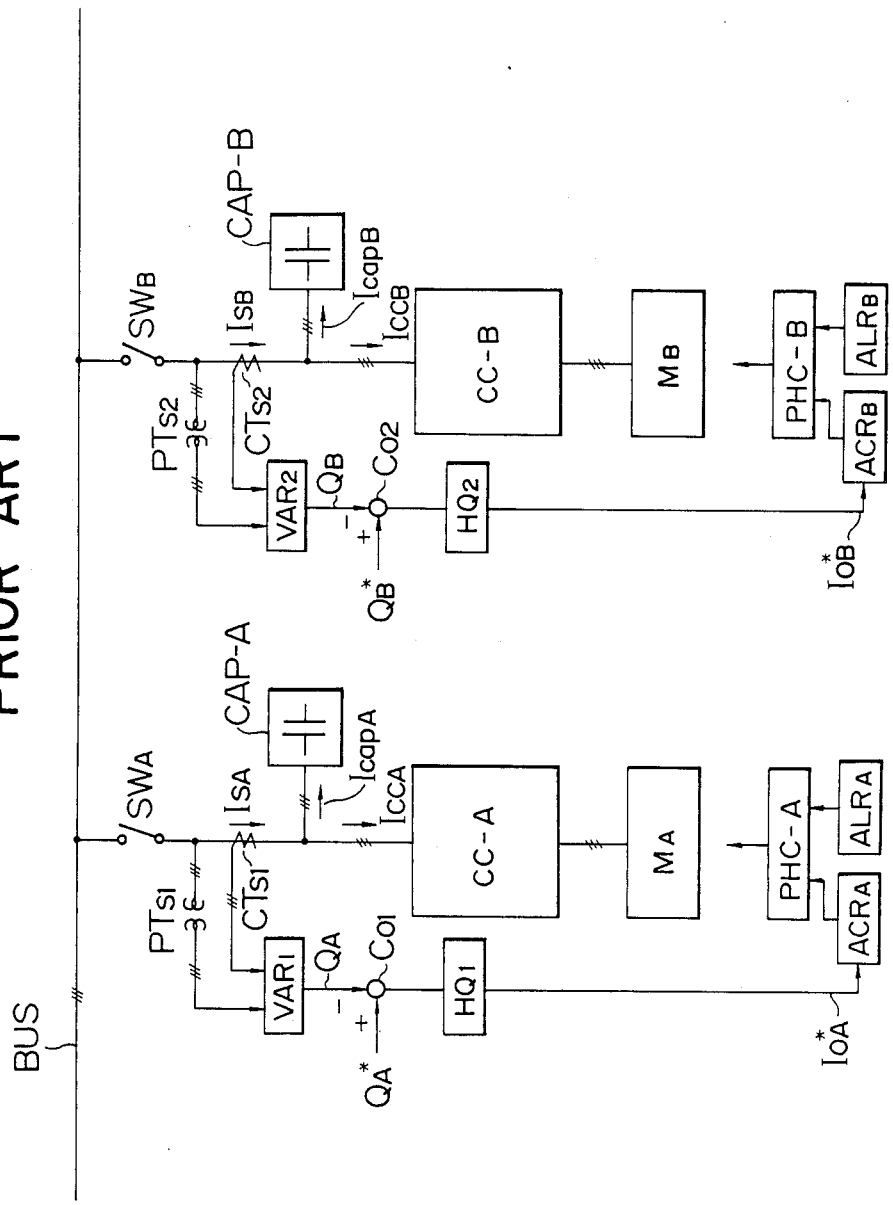
FIG. 15 is a block diagram illustrating a conventional apparatus for operating a plurality of cycloconverters in a parallel fashion.

Referring to FIG. 15, there is shown an example of a conventional apparatus for operating a plurality of cycloconverters in a parallel fashion.

The parallel operating apparatus shown includes a power supply line BUS of a three-phase ac power supply, main switches $SW_A$, $SW_B$, ..., power factor compensating capacitors CAP-A, CAP-B, ..., circulating current type cycloconverters CC-A, CC-B, ... of three-phase to three-phase conversion system, ac motors $M_A$, $M_B$, ..., current transformers $CT_{S1}$, $CT_{S2}$, ..., transformers $PT_{S1}$, $PT_{S2}$, ..., reactive power computing circuits $VAR_1$, $VAR_2$, ..., comparators $CQ_1$, $CQ_2$, ..., reactive power control compensating circuit $HQ_1$, $HQ_2$, ..., circulating current control circuits $ACR_A$, $ACR_B$, ..., load current control circuits $ALR_A$, $ALR_B$, ..., and phase control circuits PHC-A, PHC-B, ... The above-mentioned ac motors $M_A$, $M_B$, ... are installed in an apparatus wherein there is not employed an operating mode such that all of plural motors e.g. mill motors etc. are placed in load conditions at the same time, but the apparatus includes an arbitrary number of motors placed in light load conditions or out of operation.

The load current control circuit $ALR_A$ detects a current (load current) delivered to the ac motor MA to adjust an output voltage of the cycloconverter CC-A through the phase control circuit PHC-A so that the current detected is equal to a command value.

The circulating current control circuit $ACR_A$ detects a current circulating in the cycloconverter CC-A controls a difference voltage (i.e. a voltage applied to a dc reactor) between output voltages of the positive and negative group converters provided in the cycloconverter CC-A through the phase control circuit PHC-A so that the circulating current detected is equal to a command value.

At the receiving-end of the cycloconverter CC-A, the power factor compensating capacitor CAP-A is connected. The detection of a reactive current component $I_Q$ (proportional to the reactive power $Q_A$) of an input current $I_{SA}$ including a leading current $I_{cap}$ of the power factor compensating capacitor CAP-A is carried out to output a circulating current command value $I_{OA}*$ to the circulating current control circuit $ACR_A$ so that the reactive current component $I_Q$ detected is equal to zero.

The cycloconverter CC-B is configured in the same manner as the cycloconverter CC-A to control a circulating current $I_{OB}$ so that a reactive power $Q_B$ at the receiving-end is equal to zero.

The drawbacks with such a conventional apparatus for operating cycloconverters in a parallel fashion are as follows.

(1) It is necessary to provide power factor compensating capacitors for respective cycloconverters in a distributed manner, resulting in complicated wiring requiring a large area.

(2) Where there occurs a gate interruption in one or more of cycloconverters due to a failure, a power factor compensating capacitor connected at the receiving-end of the failed cycloconverter allows the total reactive power to lead, resulting in the possibility that a power supply voltage rises.

(3) The capacity of a power factor compensating capacitor connected at a receiving-end of each cycloconverter is so designed that a power factor at the receiving-end becomes unity when each cycloconverter is placed in a maximum load condition (i.e. when a lagging reactive power is maximum). Namely, independently of operating modes of other cycloconverter, the capacity of the power factor compensating capacitor is determined to provide a leading reactive power sufficient to cancel the maximum value of the lagging reactive power of the failed cycloconverter itself. This requires a power factor compensating capacitor having an unnecessary capacity.

(4) An increase in the capacity of the power factor compensating capacitor results in an increase in each capacity of power transformers or converters. Accordingly, under a light-load condition, an unnecessary circulating current will flow and an operation having a poor efficiency cannot be avoided.

(5) Where the capacity of the power factor compensating capacitor is determined so that a power factor at the receiving-end is equal to unity when each cycloconverter is operated under a rated load condition, the value of a circulating current command value of each cycloconverter becomes negative under an overload condition, with the result that each cycloconverter is operated under the condition where the circulating current is zero. For this reason, each cycloconverter operates as a cycloconverter of the noncirculating current type, with the result that the waveform of an output current is greatly distorted. As a result, this allows the upper limit of an output frequency to be lowered.

PREFERRED EMBODIMENTS OF THE INVENTION

Figure 1:
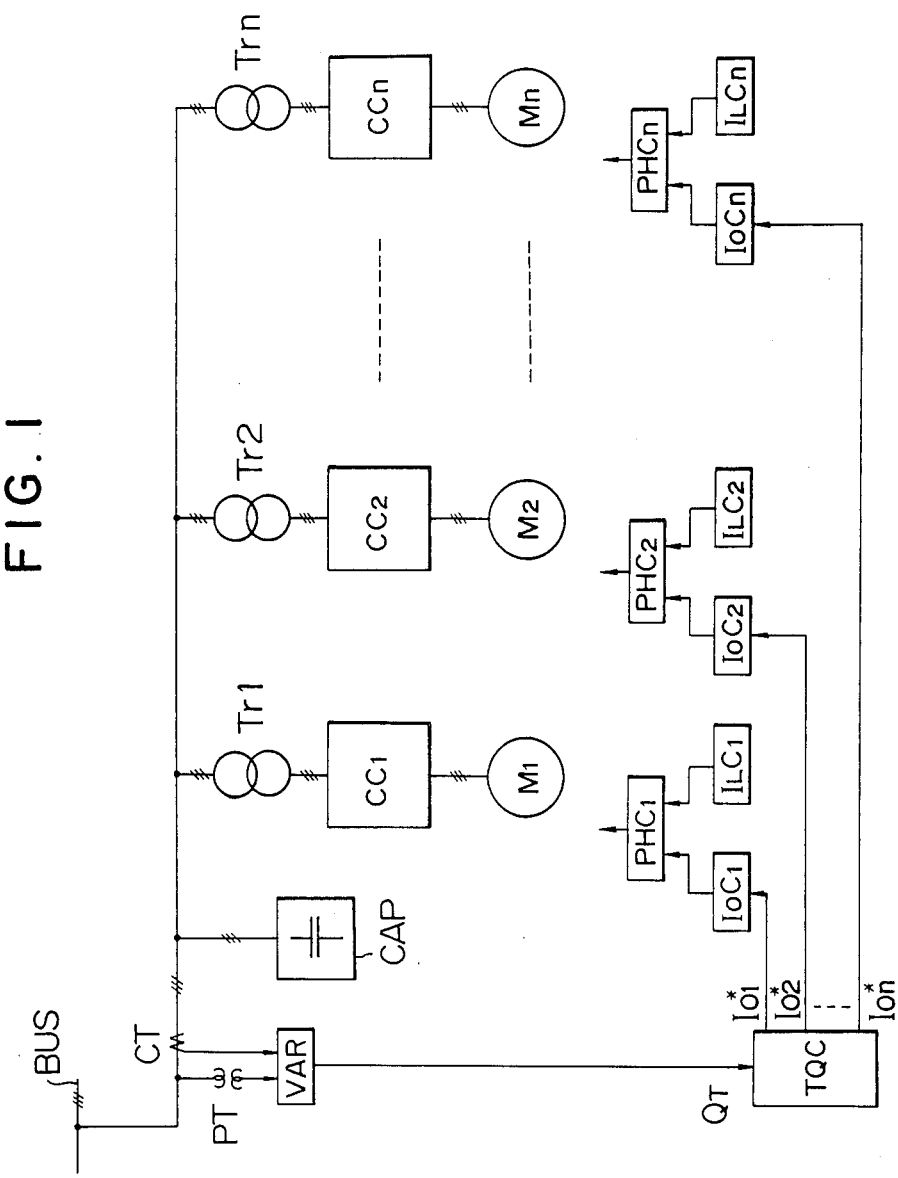
FIG. 1 is a block diagram illustrating an embodiment of an apparatus for operating cycloconverter in a parallel fashion.

Referring to FIG. 1, there is shown an embodiment of an apparatus for operating cycloconverters in a parallel fashion according to the present invention.

The apparatus shown includes a power supply line BUS of a three-phase ac power supply, a power factor compensating capacitor CAP, power transformers $T_{r1}$, $T_{r2}$, .... $T_{rn}$, cycloconverters $CC_1$, $CC_2$, ... $CC_n$ of the circulating current type, and ac motor loads $M_1$, $M_2$, ... $M_n$.

A control circuit for the apparatus comprises a three-phase current detector CT, a three-phase voltage detector PT, a reactive power computing circuit VAR, a total reactive power control circuit TQC, load current control circuits $I_LC_1$, $I_LC_2$, ..., $I_LC_n$, circulating current control circuits $I_OC_1$, $I_OC_2$, ... $I_OC_n$, and phase control circuits $PHC_1$, $PHC_2$, ... $PHC_n$.

Figure 2:
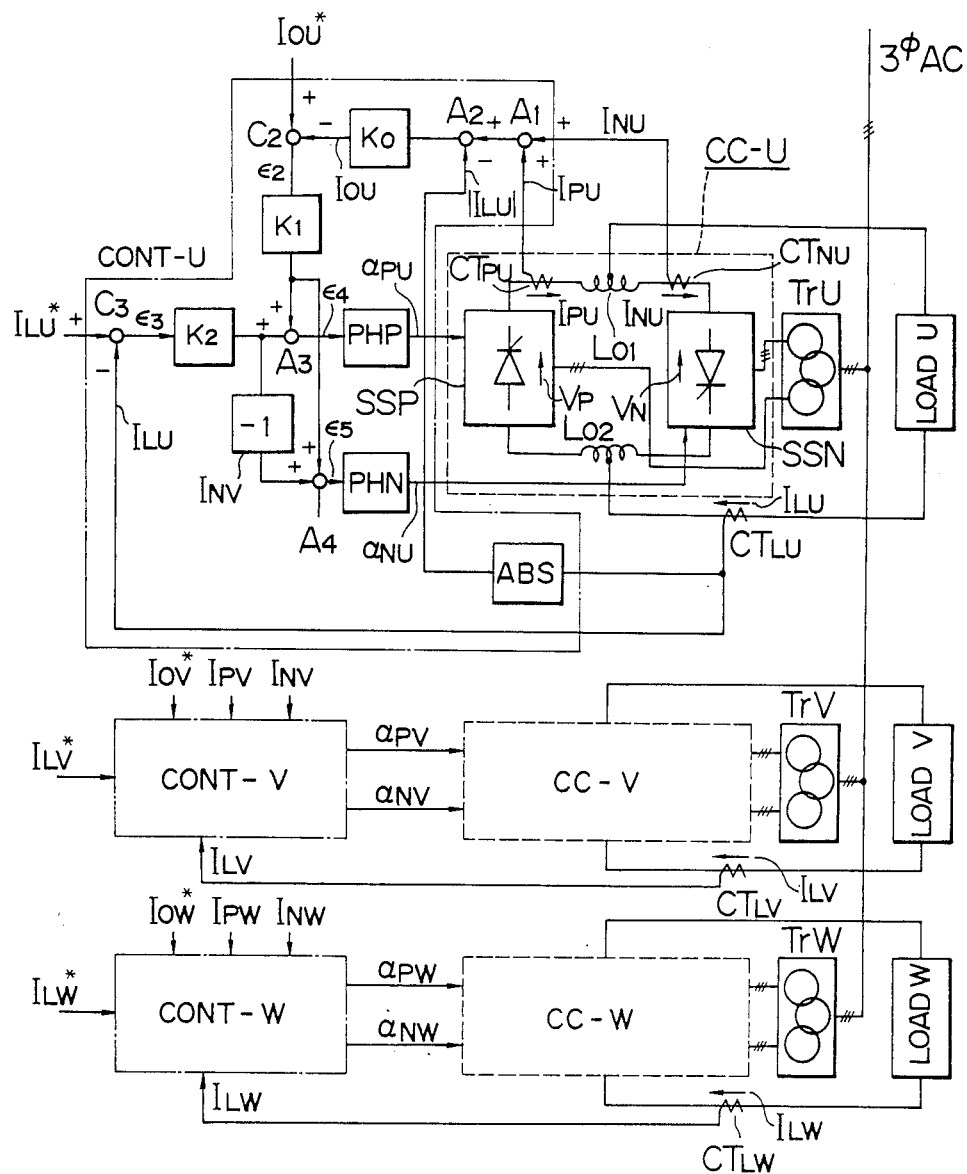
FIG. 2 is a block diagram illustrating an embodiment of a cycloconverter employed in the apparatus shown in FIG. 1.

Initially, the normal operation of the cycloconverter $CC_1$ will be described. Referring to FIG. 2, there is shown an embodiment of a three-phase output cycloconverter. The system shown includes power transformers TrU, TrV and TrW, U-, V- and W-phase cycloconverters of the circulating current type CC-U, CC-V and CC-W, respectively, armature windings of the motor $M_1$ shown in FIG. 1 $\overline{LOAD}_U$, $\overline{LOAD}_V$ and $\overline{LOAD}_W$.

The U-phase cycloconverter CC-U comprises a positive group converter SSP, a negative group converter SSN, and reactors $L_{01}$ and $L_{02}$ with intermediate taps. A control circuit CONT-U for the U-phase cycloconverter CC-U comprises a load current detector $CT_{LU}$, an output current detector $CTP_U$ for the positive group converter, an output current detector $CT_{NU}$ for the negative group converter, adders $A_1$ to $A_4$, comparators $C_2$ and Chd 3, operational amplifiers $K_0$, $K_1$ and $K_2$, and phase control circuits PHP and PHN.

The V-phase and W-phase cycloconverters are configured in the same manner as the U-phase cycloconverter. Further, control circuits CONT-V and CONT-W encircled by single dotted lines are configures in the same manner as the control circuit CONT-U.

The operation of a load current control of the cycloconverter of the circulating current type will be described by taking the case of the U-phase.

A load current command $I_{LU}^*$ is compared with a current flowing in the load to control phase control circuits PHP and PHN so that the cycloconverter CC-U produces a voltage proportional to an error $\epsilon_3 = I_{LU}^* - I_{LU}$. The error $\epsilon_3$ amplified by an amplifier $K_2$ is input to the phase control circuit PHN through an inverting circuit INV so that the relationship expressed as $\alpha_{NU} = 180°\,C. - \alpha_{PU}$ holds where $\alpha_{PU}$ and $\alpha_{NU}$ denote output phase of the phase control circuits PHP and PHN, respectively. Namely, a normal operation is carried out with an output voltage expressed as $V_{PU} = KV \cdot V_S \cdot \cos \alpha_{PU}$ of the positive group converter SSP and an output voltage expressed as $V_{NU} = -KV \cdot V_S \cdot \cos \alpha_{PU}$ being balanced with each other at the load terminal. By sinusoidally changing the current command value $I_{LU}^*$, the error $\epsilon_3$ varies according to this. Accordingly, the above-mentioned output phases $\alpha_{PU}$ and $\alpha_{NU}$ are controlled so that a sinewave current $I_L$ flows in the load (the armature winding of the three-phase ac motor). In such an ordinary operation, the output voltage $V_{PU}$ of the positive group converter SSP and the output voltage $V_{NU}$ of the negative group converter SSN are balanced with each other, with the result that little circulating current $I_O$ flows.

Load currents $I_{LV}$ and $I_{LW}$ of V-phase and W-phase cycloconverters are controlled in the same manner.

Subsequently, the control operation of the circulating current $I_O$ will be described by taking the case of U-phase.

The circulating current $I_O$ of the cycloconverter is detected as follows. The circulating current $I_O$ is determined by obtaining the sum of a value detected of the output current $I_{PU}$ of the positive group converter SSP to a value detected of the output current $I_{LU}$ of the negative converter SSN, subtracting an absolute value of a value detected of the load current $I_{LU}$ from the sum, and multiplying it by one-half. The relationship is expressed as follows:

$$I_{OU} = (I_{PU} + I_{NU} - |I_{LU}|)/2$$

The circulating current $I_O$ thus obtained is compared with the command value $I_{OU}^*$. An error $\epsilon_2 = I_{OU}^* - I_{OU}$ is input to the adders $A_3$ and $A_4$ through the amplifier $K_1$.

Accordingly, inputs $\epsilon_4$ and $\epsilon_5$ to the phase control circuits PHP and PHN are respectively expressed as follows:

$$\epsilon_4 = K_2 \epsilon_3 + K_1 \cdot \epsilon_2, \text{ and}$$

$$\epsilon_5 = -K_2 \cdot \epsilon_3 + K_1 \cdot \epsilon_2.$$

Accordingly, the relationship of $\alpha NU \approx 180° - \alpha_{PU}$ cannot be held. The output voltage $V_{PU}$ of the positive group converter SSP and the output voltage $V_{NU}$ of the negative group converter SSN are unbalanced by a value proportional to $K_1 \cdot \epsilon_2$. Its difference voltage is applied to the dc reactors $L_{01}$ and $L_{02}$, with the result that the circulating current $I_{OU}$ flows.

When the circulating current $I_{OU}$ flows greater than the command value $I_{OU}^*$, the error $\epsilon_2$ becomes negative, with the result that the relationship $V_{PU} < V_{NU}$ holds to decrease. A control is effected so that the circulating current $I_{OU}$ is finally equal to the command value $I_{OU}^*$.

Circulating currents $I_{OV}$ and $I_{OW}$ of V-phase and W-phase cycloconverters are respectively controlled in accordance with their command values $I_{OV}^*$ and $I_{OW}^*$ in the same manner as stated above.

Ordinarily, the above-mentioned circulating current command values $I_{OU}^*$, $I_{OV}^*$ and $I_{OW}^*$ are set at the same value. However, a method has been proposed in the Japanese Patent Publication Tokkaisho No. 56-133982 to distribute such command values depending upon load currents in respective phases in order to suppress an increase in the current capacity of the cycloconverter.

The elementary operation of the cycloconverter $CC_1$ shown in FIG. 1 has been described. Other cycloconverters operate in the same manner.

An operation of a reactive power control at the receiving-end of the apparatus shown in FIG. 1 is now referred to.

Figure 3:
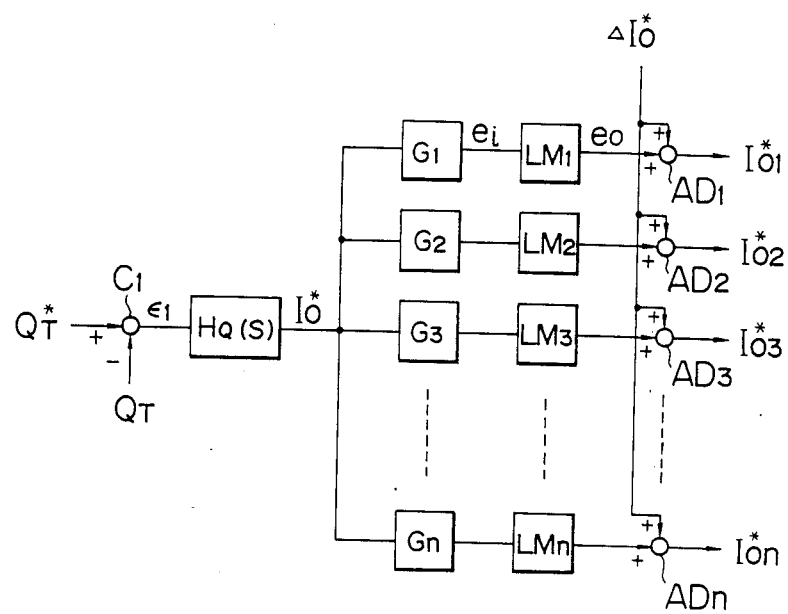
FIG. 3 is a block diagram illustrating an embodiment of a total reactive power control circuit TQC employed in the apparatus shown in FIG. 1.

FIG. 3 shows an embodiment of the total reactive power control circuit TQC provided in the apparatus shown in FIG. 1. The circuit shown comprises a comparator $C_1$, a control compensation, circuit $H_Q(S)$, operational amplifiers $G_1$ to $G_N$, limitter circuits $LM_1$ to $LM_n$, and adders $AD_1$ to $AD_n$.

First, it is necessary to detect a reactive power $Q_T$ at the receiving end of the entire system. Namely, currents and voltages at the receiving-end are detected by the three-phase current detector CT and the three-phase voltage detector PT, respectively. These values detected are input to the reactive power computing circuit VAR. The circuit VAR performs a computation to dephase the three-phase voltages detected by 90° and to multiply the voltages thus dephased by currents of respective phases. Finally, by summing these values corresponding to three-phase, the instantaneous value of the reactive power $Q_T$ at the receiving-end is thus obtained.

In the circuit shown in FIG. 3, the above-mentioned detected reactive power $Q_T$ and its command value are input to the comparator $C_1$ to obtain an error $\epsilon_1 = Q_T^* - Q_T$. The error $\epsilon_1$ thus obtained is input to the next stage of the control compensating circuit $H_Q(S)$ to effect a proportional amplification or an integral amplification. Thus, the output $I_O^*$ of the control compensating circuit $H_Q(S)$ serves as a circulating current command value. In this instance, the following processing is required for distributing circulating currents in proportion to the output capacity of each cycloconverter and for preventing the circulating current from being interrupted.

Assuming now that the operational amplifiers $G_1$ to $G_n$ are multiple distribution factors proportional to the capacity of each cycloconverter and they have the same capacity, $G_1 = G_2 = G_3 = \ldots = G_n = 1$. For instance, where only the capacity of the cycloconverter $CC_2$ is small as compared to others, i.e., the cycloconverter $CC_2$ has a capacity one-tenth of each capacity of others, $G_2 = 0.1$ and $G_1 = G_3 = \ldots G_n = 1$.

To obtain the circulating current command value $I_{01}^*$ of the cycloconverter $CC_1$, an output signal of the operational amplifier $G_1$ is input to the adder $AD_1$ through the limiter circuit $LM_1$.

Figure 4:
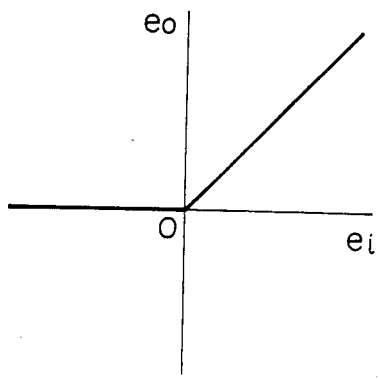
FIG. 4 is an explanatory view showing an characteristic in the operation of the circuit shown in FIG. 3.

The limiter circuit $LM_1$ has a characteristic as shown in FIG. 4. Namely, where an input signal $e_i$ is positive, no limit operation is applied to an output signal $e_i$, with the result that an output signal $e_o$ equal to the input signal $e_i$ (i.e., $e_o = e_i$) is produced. In contrast, when the input signal is negative, the output signal $e_o$ is limited to zero (i.e., $e_o = 0$). Namely, the limiter circuit $LM_1$ so operates that the circulating current command value $I_{01}^*$ is always positive.

Further, the output $e_o$ of the limiter circuit $LM_1$ is added to a preselected minimum circulating current command value $I_O^*$. Thus, the circulating current command value is expressed as follows:

$$I_{01}^* = e_o + \Delta I_O^*.$$

Circulating current command values $I_{02}^*, I_{03}^*, \ldots, I_{On}^*$ of other cycloconverters are also determined in the same manner.

Where the value detected (the sign of lag is positive) of the reactive power at the receiving-end is smaller than its command value $Q_T^*$, the error $\epsilon_1 = Q_T^* - Q^*$ becomes positive to increase an output $I_O^*$ of the control compensating circuit $H_Q(S)$. Accordingly, circulating current command values $I_{01}^*, I_{02}^*, \ldots, I_{On}^*$ delivered to the respective cycloconverters also increase, thus to increase actual circulating currents.

When the circulating current of each cycloconverter increases, a lagging reactive power $Q_T$ at the receiving-end increases. Thus, the relationship of $Q_T^*$ will be eventually established.

In contrast, when $Q_T^* < Q_T$, the error $\epsilon_1$ becomes negative to decrease the circulating current of each cycloconverters to decrease the lagging reactive power $Q_T$. As a consequence, a control is so conducted that the relationship of $Q_T \approx Q_T^*$ will be eventually established.

Where the error $\epsilon_1$ increases in a negative direction, the output of the control compensating circuit $H_Q(S)$ becomes negative. However, outputs $e_o$ of the limiter circuits $LM_1, LM_2, \ldots LM_n$ do not become negative, but become zero.

Accordingly, the following relationship holds in connection with circulating current command values of respective cycloconverters, $$I_{01}^* = I_{02}^* = I_{03}^* = \ldots = I_{On}^* = I_O^*.$$

Thus, the minimum circulating currents will flow. Namely, there is no possibility that a break or interruption of the circulating current will occur, thus making it possible to maintain the cycloconverter of the circulating current type.

Figure 5:
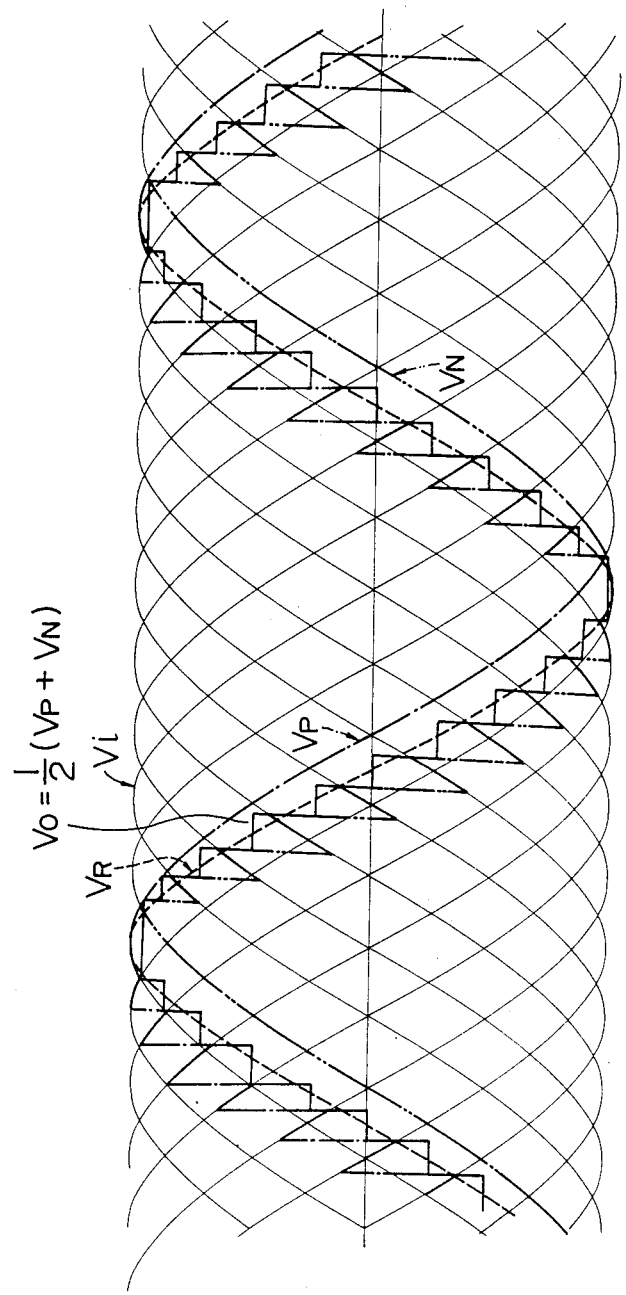
FIG. 5 shows an output voltage waveform of a cycloconverter of the circulating current type.

FIG. 5 shows an output voltage waveform of a cycloconverter of the circulating current type having 12 control phases when the setting is made such that an output frequency $f_0$ is 1.2 times larger than an input frequency $f_i$. In this figure, $V_i$ (thick solid line) represents an input voltage, $V_P$ (thick single dotted lines) an output voltage of the positive group converter, $V_N$ (thick double dotted lines) an output voltage of the negative group converter, $V_R$ (thick dotted lines) an output voltage required, and $V_O$ (thick solid line) an output voltage (which is applied to the load) actually produced by the cycloconverter.

The output voltage $V_O$ is obtained as an average of the output voltages $V_P$ and $V_N$ and represents a stair-stepped waveform. The output voltages $V_P$ and $V_N$ are created by connecting portions (segments) of the input voltage Vi to each other, respectively. When an attention is drawn to only each voltage, it could not be avoided that an uncontrollable period occurs in the same manner as the cycloconverter of a non-circulating current type. However, when the output voltage $V_P$ is in an uncontrollable condition, the output voltage $V_N$ is in an uncontrollable condition, the output voltage $V_P$ functions so as to compensate for the lack of the ability of the former. As a result, the output voltage $V_O$ can be so controlled that it follows the command value $V_R$.

Namely, the normal operating mode of the cycloconverter of the circulating current type is to operate both the positive group converter SSP and the negative converter SSN at the same time. Accordingly, if an operating mode is employed to activate only one of them, viz., to allow the circulating current to be zero, the cycloconverter may have a sawtooth output waveform due to either of the positive and negative group converters, with the drawback that many harmonics are included.

Accordingly, the cycloconverter of the circulating current type has employed an operating mode such that the circulating current simply flows therein.

Figure 6A:
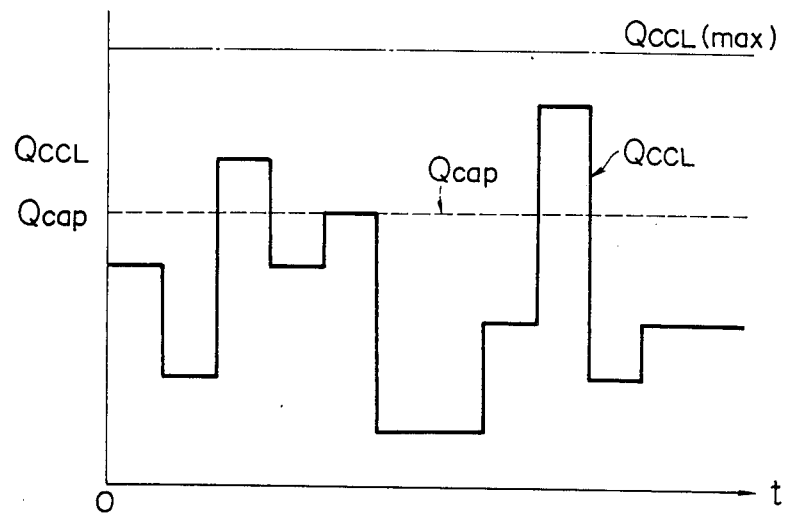
FIG. 6 is an explanatory view showing an operating mode in the operation of the apparatus shown in FIG. 1.
Figure 6B:
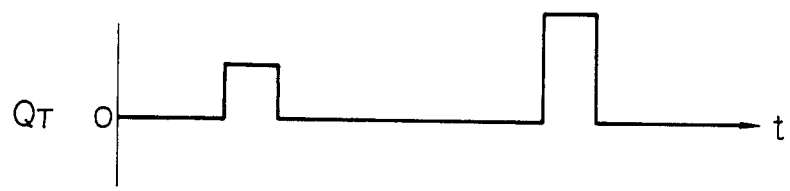
Figure 6C:
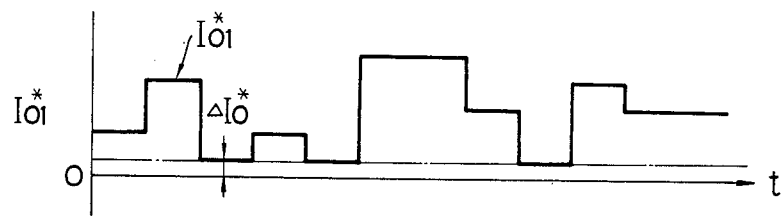

FIG. 6 shows an example of an operating mode of the system shown in FIG. 1. In FIG. 6a, $Q_{cap}$ = const. represents a leading reactive power given by the power factor compensating capacitor CAP, and $Q_{CCL}$ a reactive power at the time when the minimum circulating current $I_O$ flows in each cycloconverter, given by the entirety of the cycloconverters. FIG. 6b shows a reactive power $Q_T$ at the receiving-end of the entirety of the system, and FIG. 6c shows a circulating current $I_{01}^*$ command value of the cycloconverter $CC_1$.

When $Q_{CCL} < Q_{cap}$, it is possible to allow the reactive power $Q_T$ to be zero by flowing circulating currents in the respective cycloconverters.

In contrast, when $Q_{CCL} > Q_{cap}$, i.e., some cycloconverters are operated under overload operation at the same time, a control is conducted so that the circulating current of each cycloconverter becomes equal to the minimum value $\Delta I_O^*$ as previously described. As a result, the reactive power $Q_T$ at the receiving-end lags, with the result that the relationship of the power factor of unity cannot be held.

Accordingly, where the overload operation stated above frequently occurs, it is necessary to provide for a power factor compensating capacitor CAP sufficient to cope with the overload operation.

However, in general, there are many cases where the cycloconverter system is operated for a long time under a load condition below the rated load and an overload operation is required. Especially, where a plurality of cycloconverters are operated in a parallel fashion, there is little possibility that the necessity of the overload operation occurs at the same time.

As previously described, when $Q_{CCL} > Q_{cap}$, the reactive power $Q_T$ lags. However, from a practical point of view, the time duration of the lagging reactive power is small and the ratio of the occurrence thereof is also small, with the result that the influence on the power system is not great.

It is very seldom that all cycloconverters are operated under overload condition at the same time. $Q_{CCL}$ (max) in FIG. 6a indicates a lagging reactive power when all the cycloconverters are operated under overload condition. In accordance with the operating system, the total leading reactive power $Q_{cap}$ of the power factor compensating capacitor is determined so as to cancel the maximum reactive power $Q_{CCL}$ (max). Accordingly, this increases not only the capacity of the power factor compensating capacitor but also the circulating current flowing in the cycloconverter. As a result, a large capacity of converters, power transformers and dc reactors etc. are required.

In contrast, the system according to the present invention can determine the capacity of the power factor compensating capacitor taking into account the total operating mode of the entirety of the cycloconverters. Accordingly, it is sufficient to provide for a minimum value required as the power factor compensating capacitor, with the result that a considerably reducing effect will be expected. Even in the case where the value of $Q_{CCL}$ is larger than the value of $Q_{CCP}$, a control is carried out such that a minimum circulating current flows, thus ensuring an continuous operation without losing the characteristic of the cycloconverter of the circulating current type. Accordingly, this makes it possible to raise an upper limit of an output frequency and to deliver sinewave currents with small distortion in waveform to loads.

Figure 7:
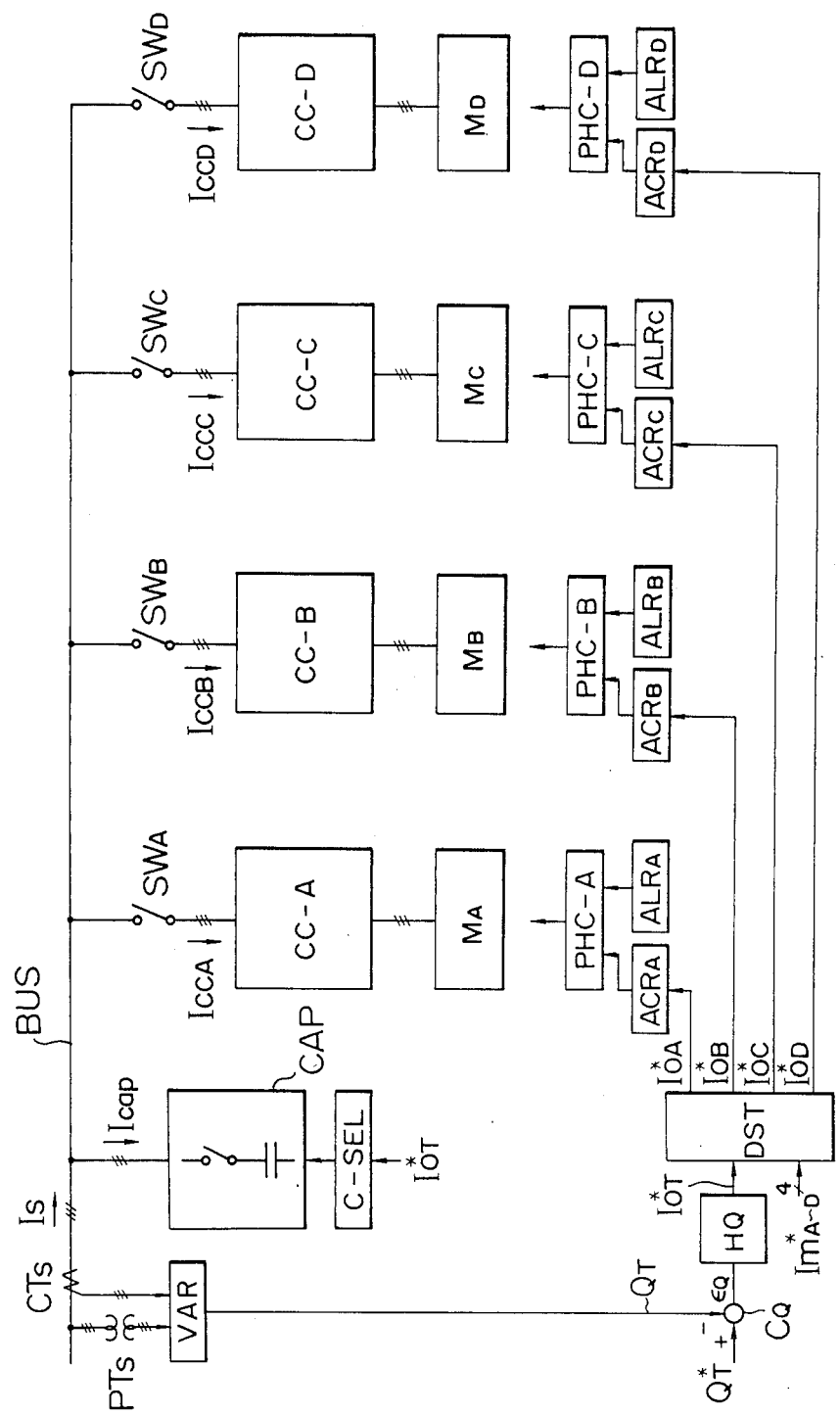
FIG. 7 is a block diagram illustrating another embodiment of an apparatus for operating cycloconverters in a parallel fashion according to the present invention.

FIG. 7 is a block diagram illustrating another embodiment of an apparatus for operating a plurality of cycloconverters in a parallel fashion.

The apparatus shown comprises a power supply line of a three-phase power supply, a power factor compensating capacitor CAP, main switches $SW_A$, $SW_B$, $SW_C$ and $SW_D$, circulating current type cycloconverters CC-A, CC-B, CC-C and CC-D of three-phase to three phase conversion system, ac motors $M_A$, $M_B$, $M_C$ and $M_D$, a current transformer $CT_S$, a transformer $PT_S$, a reactive power computing circuit VAR, a comparator $C_Q$, a reactive power control compensative circuit HQ, a distribution circuit DST, circulating current control circuits $ACR_A$, $ACR_B$, circulating current control circuits $ACR_A$, $ACR_B$, $ACR_C$ and $ACR_D$, load current control circuits $ALR_A$, $ALR_B$, $ALR_C$ and $ALR_D$, phase control circuits PHC-A, PHC-B, PHC-C and PHC-D, and a switching control circuit C-SEL for a power factor compensating capacitor.

Initially, the operation of the cycloconverter CC-A of the circulating current type will be described.

Figure 8:
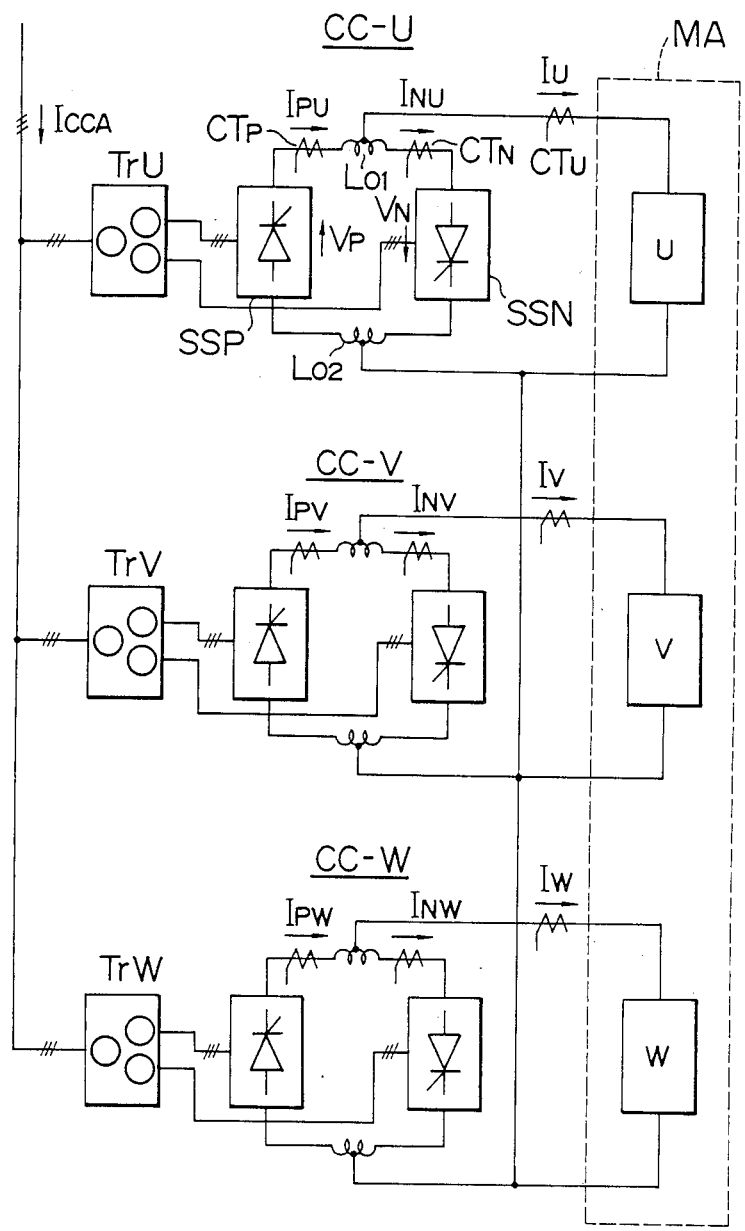
FIG. 8 is a block diagram illustrating a main circuit of a cycloconverter employed in the apparatus shown in FIG. 7.

FIG. 8 is a block diagram illustrating an example of a main circuit of the circulating current type cycloconverter CC-A and the ac motor $M_A$. The circuit shown includes power transformers TrU, TrV and TrW, U-, V- and W-phase cycloconverters CC-U, CC-V and CC-W, an armature $M_A$ of the ac motor, a U-phase armature winding U, a V-phase armature winding V, and a W-phase armature winding. The U-phase cycloconverter CC-U comprises a positive group converter SSP, a negative group converter SSN and dc reactors $L_{O1}$ and $L_{O2}$.

Figure 9:
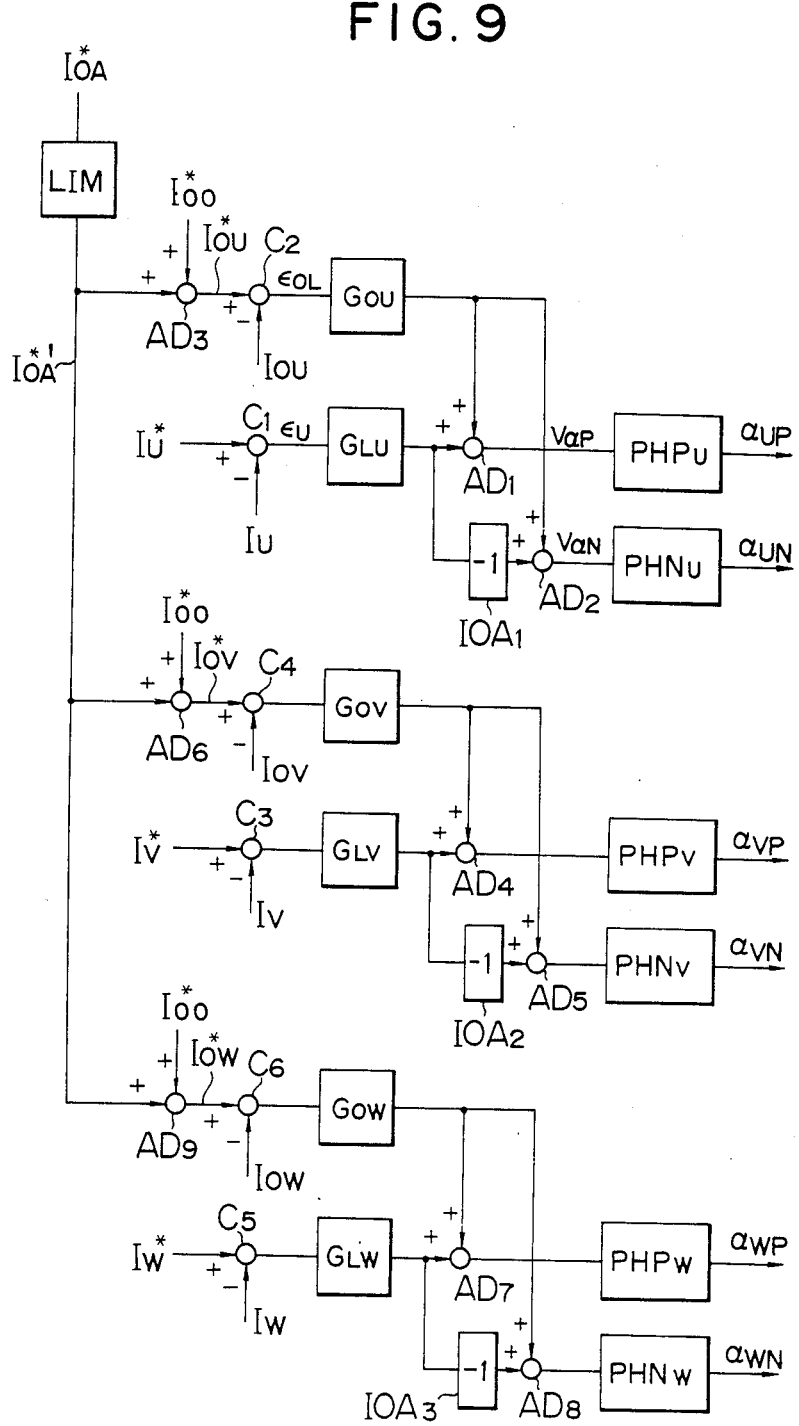
FIG. 9 is a block diagram illustrating an embodiment of a control circuit provided in the cycloconverter shown in FIG. 8.
Figure 10:
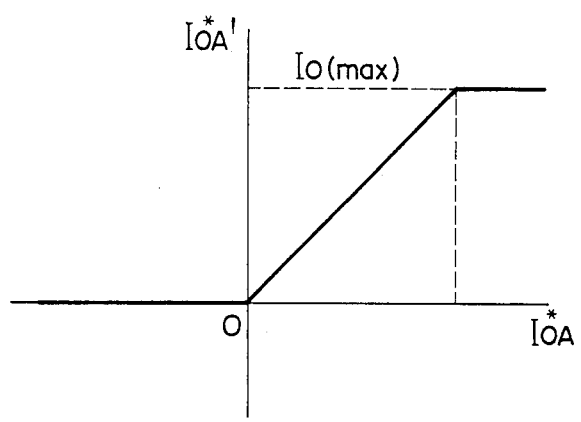
FIG. 10 is an explanatory view showing a characteristic in the operation of the circuit shown in FIG. 9.

FIG. 9 is a block diagram illustrating an example of a control circuit for cycloconverter. The control circuit shown comprises a limiter circuit LIM, adders $AD_1$ to $AD_9$, comparators $C_1$ to $C_6$, circulating current control compensative circuits $G_{OU}$, $G_{OV}$ and $G_{OW}$, load current control compensative circuits $G_{LU}$, $G_{LV}$ and $G_{LW}$, inverting amplifiers $IOA_1$ to $IOA_3$, and phase control circuits $PHP_U$, $PHN_U$, $PHP_V$, $PHN_V$, $PHP_W$ and $PHN_W$.

The operation of the cycloconverter CC-A will be described with reference to FIGS. 8 and 9.

The cycloconverter CC-A, which is an apparatus to directly convert a three-phase ac into a three-phase ac having a different frequency, is divided into the U-phase cycloconverter CC-U, the V-phase cycloconverter CC-V and the W-phase cycloconverter CC-W.

The operation of a load current control and a circulating current control carried out in the U-phase cycloconverter will be first described.

A control of a load current $I_U$ is effected as follows. A load current $I_U$ is detected by the current detector $CT_U$ to input the load current $I_U$ detected to the comparator $C_1$ shown in FIG. 9. The comparator $C_1$ compares the load current command value $I_U$ with the above-mentioned value detected of the load current to output an error $\epsilon_U = I_U^* - I_U$. The error $\epsilon_U$ is input to the next stage of the control compensative circuit $G_{LU}$ to undergo a proportional amplification (differential or integral element may be used for improving a control response). This proportional constant will be referred to as $K_U$. An output $K_U \cdot \epsilon_U$ of the control compensative circuit $G_{LU}$ is input to the phase control circuit $PHP_U$ of the positive group converter SSP through the adder $AD_1$. A signal $-K_U \cdot \epsilon_U$ obtained by passing the output $K_U \cdot \epsilon_U$ through the inverting amplifier $IOA_1$ is input to the phase control circuit $PHN_U$ of the negative group converter SSN.

The positive group converter SSP produces a voltage $V_P$ proportional to the input $v_{\alpha P} = K_V \cdot \epsilon_U$ of the phase control circuit $PHP_U$ in a direction indicated by an arrow in FIG. 2. Likewise, the negative converter SSN produces a voltage proportional to the input signal $v_{\alpha N}$ of the phase control circuit $PHN_U$ in a direction indicated by an arrow in the figure.

Assuming now that an output signal from the circulating current control circuit is sufficiently small, it is expressed as follows:

$$v_{\alpha N} = -K_U \cdot \epsilon_U = -v_{\alpha P}.$$

Accordingly, a firing phase angle $\alpha_{NU}$ of the negative group converter SSN has the following relationship with respect to a firing phase angle $\alpha_{PU}$ of the positive group converter SSP, $$\alpha_{NU} = 180° - \alpha_{PU}.$$

Namely, where the positive group converter SSP produces a positive voltage $V_P$ in a direction indicated by an arrow in FIG. 8, the negative group converter SSN produces a negative output voltage $-V_N$. Namely, voltages at the intermediate terminal of the dc reactor are balanced with each other as indicated by $V_P = -V_N$.

Accordingly, a voltage expressed below is applied to the load U, $$(V_P - V_N)/2 = K_C \cdot (v_{\alpha P} - v_{\alpha N})/2 = K_C \cdot K_U \cdot \epsilon_U,$$

where $K_C$ is a conversion factor.

When $I_U^* > I_U$, the error $\epsilon_U$ becomes positive and the voltage $V_U = K_C \cdot K_U \cdot \epsilon_U$ applied to the load U becomes positive to increase the load current $I_U$. As a result, the relationship of $I_U \approx L_U^*$ will be eventually established, thus placing the system in a balanced condition.

By changing sinusoidally the load current command value $I_U^*$, the actual current $I_U$ is controlled according to this, thus making it possible to deliver a sinewave current in the load U.

Next, the operation of a circulating current control of the U-phase cycloconverter will be described.

First it is necessary to detect an output current $I_P$ of the positive group converter SSP and an output current $I_N$ of the negative group converter SSN by current detectors $CT_P$ and $CT_N$, respectively, to obtain a circulating current $I_{OU}$ of the U-phase cycloconverter by performing the following computation:

$$I_O = (I_P + I_N - |I_U|)/2,$$

where $|I_U|$ represents an absolute value of the value detected of the load current $I_U$.

The circulating current $I_{OU}$ thus obtained is input to the comparator $C_2$ shown in FIG. 9 and then is compared with its command value $I_{OU}^*$. An error $\epsilon_{OU} = I_{OU}^* - I_{OU}$ is input to the adders $AD_1$ and $AD_2$ through the control compensative circuit $G_{OU}$ (proportional element is referred to as $K_{OU}$).

Accordingly, inputs $v_{\alpha P}$ and $v_{\alpha N}$ to the phase control circuits $PHP_U$ and $PHN_U$ are expressed as follows:

$$v_{\alpha P} = K_U \cdot \epsilon_U + K_{OU} \cdot \epsilon_{OU}, \text{ and}$$

$$v_{\alpha N} = -K_U \cdot \epsilon_U + K_{OU} \cdot \epsilon_{OU}.$$

Accordingly, the relationship of $\alpha_{NU} = 180° - \alpha_{PU}$ cannot be held. The output voltage $V_P$ of the positive group converter SSP and the output voltage $-V_N$ of the negative group converter SSN are unbalanced by a value proportional to $K_{OU} \cdot \epsilon_{OU}$. A voltage expressed below is applied to the dc reactors $L_{O1}$ and $L_{O2}$, with the result that a circulating current $I_{OU}$ flows.

$$V_P + V_N = K_C(v_{\alpha P} + v_{\alpha N})$$

When $I_{OU}^* > I_{OU}$, the error $\epsilon_{OU}$ becomes positive to increase the circulating current $I_{OU}$. In contrast, when $I_{OU}^* < I_{OU}$, the error $\epsilon_{OU}$ becomes negative to allow the voltage $(V_P + V_N)$ applied to the dc reactors $L_{O1}$ and $L_{O2}$ to be negative to decrease the circulating current $I_{OU}$. As a result, the relationship of $I_{OU}^* \approx I_{OU}$ will be eventually established, thus placing the system in a balanced condition.

Load currents $I_V$ and $I_W$ and circulating currents $I_{OV}$ and $I_{OW}$ of V- and W-phase cycloconverters are controlled in the same manner. Further, other cycloconverters CC-B, CC-C and CC-D are also controlled in the same manner.

The operation of a reactive power control of the system shown in FIG. 7 will be described.

First it is necessary to detect a reactive power $Q_T$ at the receiving-end of the entirety of the system. Namely, currents and voltages are detected by the three-phase current detector $CT_S$ and the three-phase voltage detector $PT_S$, respectively. The values thus detected are input to the reactive power computing circuit VAR. The circuit VAR is operative to dephase the three-phase voltages detected by 90° and to multiply them by the three-phase currents detected. By summing the values thus obtained corresponding to three-phase, the above-mentioned value of the reactive power $Q_T$ (instantaneous value is detected) at the receiving-end.

The value detected of the reactive power $Q_T$ and its command value $Q_T^*$ are input to the comparator $C_Q$ to obtain an error $\epsilon_Q = Q_T^* - Q_T$. The error $\epsilon_Q$ thus obtained is input to the next stage of the control compensative circuit HQ to effect proportional amplification or integral amplification. An output $I_{OT}^*$ of the control compensative circuit HQ serves as a circulating current command value of the entirety of the cycloconverters. To the respective cycloconverters, circulating current commands $I_{OA}^*$, $I_{OB}^*$, $I_{OC}^*$ and $I_{OD}^*$ are output through the distribution circuit DST which will be described later. The following explanation will be made on the assumption that $I_{OA}^* = I_{OB}^* = I_{OC}^* = I_{OD}^* = I_{OT}^*$.

To the cycloconverter CC-A, the circulating current command $I_{OA}^*$ is delivered. The circulating current command $I_{OA}^*$ is input to the limiter circuit LIM shown in FIG. 9 by which $I_{OA}^*$ is converted into a new command value $I_{OA'}^*$. FIG. 9 shows an input-output characteristic of the limiter circuit LIM. When the input $I_{OA}^*$ is equal to or less than zero, the output $I_{OA'}^*$ is equal to zero. In contrast, when the input $I_{OA}^*$ is larger than or equal to zero, the output $I_{OA'}^*$ is equal to $I_O$ (max) In an intermediate range, i.e., $0 < I_{OA}^* < I_O(\max)$, $I_{OA'}^* = I_{OA}$.

The output of the limiter circuit LIM is input to the adders $AD_3$, $AD_6$ and $AD_9$, in which minimum circulating current command values $I_{OO}^*$ are added to them, respectively. Accordingly, the circulating current command value $I_{OU}^*$ of the U-phase cycloconverter is expressed as follows:

$$I_{OU}^* = I_{OA'}^* + I_{OO}^*.$$

To the U- and W-phase cycloconverters, similar circulating current command values $I_{OV}^*$ and $I_{OW}^*$ are delivered. Further, to other cycloconverters CC-B, CC-C and CC-D, similar circulating current command values $I_{OB}^*$, $I_{OC}^*$ and $I_{OD}^*$ are delivered, respectively. Likewise, they are converted into new command values $I_{OB'}^*$, $I_{OC'}^*$, and $I_{OD'}^*$, through the limiter circuit, respectively. To each new command value, a minimum circulating command values $I_{OD}^*$ is added. The command values thus obtained serve as respective circulating current command values.

Where the value detected (which is positive in the case of lag) of a reactive power at the receiving-end is smaller than its command value $Q_T^*$, the error $\epsilon_Q = Q_T^* - Q_T$ becomes positive to increase an output of the control compensative circuit HQ. Accordingly, circulating current command values $I_{OA}^*$, $I_{OB}^*$, $I_{OC}^*$ and $I_{OD}^*$ are also increased to increase actual circulating currents.

When the circulating current of the cycloconverter increases, the lagging reactive power $Q_T$ at the receiving-end increases. As a result, the relationship of $Q_T = Q_T^*$ will be eventually established.

In contrast, when $Q_T^* < Q_T$, the error $\epsilon_Q$ becomes negative to increase the lagging reactive power $Q_T$. As a result, a control is so conducted that the lagging reactive power is finally equal to its command value.

Where the error $\epsilon_Q$ increases in a negative direction, the output $I_{OT}^*$ of the control compensative circuit HQ becomes negative. Accordingly, circulating current command values $I_{OA}^*$, $I_{OB}^*$, $I_{OC}^*$ and $I_{OD}^*$ delivered to respective cycloconverters also become negative.

However, an output $I_{OA'}^*$, of the limiter circuit LIM does not become negative, but becomes equal to zero. Accordingly, to the U-phase cycloconverter of the cycloconverter CC-A, $I_{OU}^* = I_{OA'}^* + I_{OO}^* = I_{OO}^*$ is delivered as a circulating current command. Thus, a minimum circulating current $I_{OU} \approx I_{OO}^*$ continues to flow. The operations of the U- and W-phase cycloconverters are the same as stated above. Further, similar minimum circulating currents continue to flow in other cycloconverters CC-B, CC-C and CC-D. As a result, there is no possibility that the circulating current is interrupted, thus making it possible to maintain a characteristic of the circulating current type.

Figure 11:
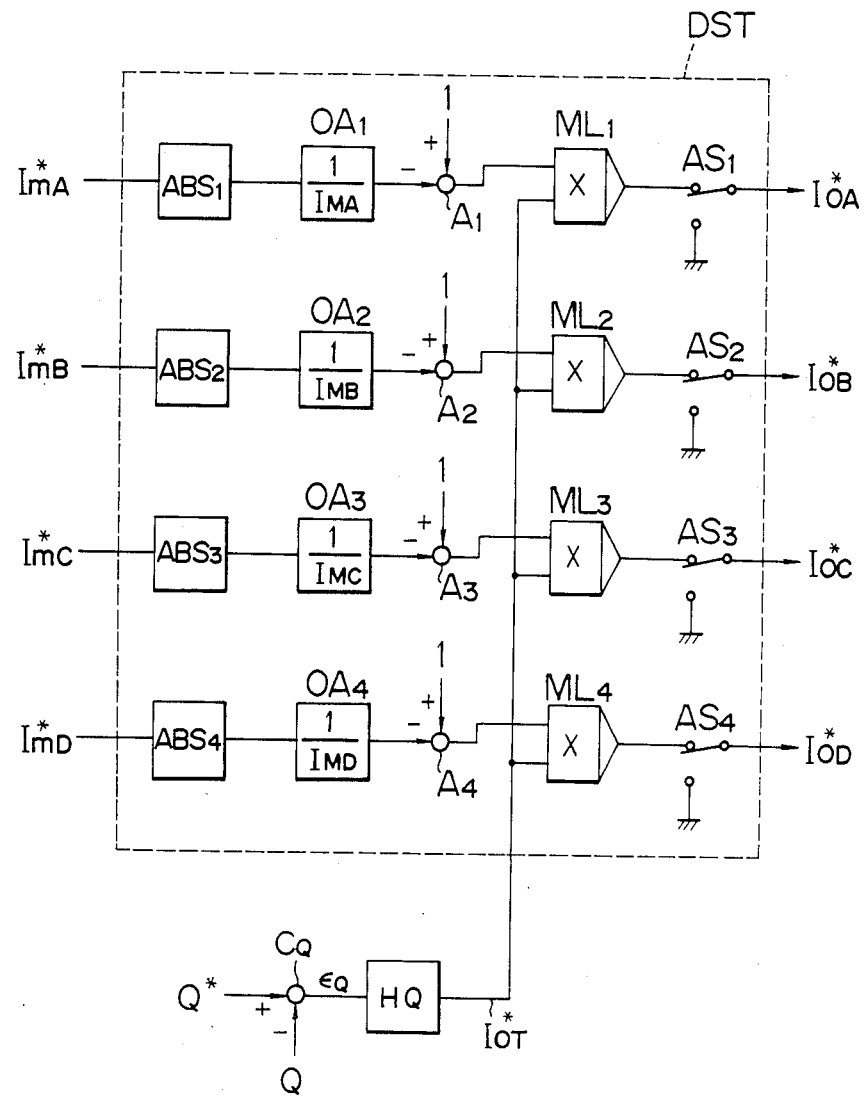
FIG. 11 is a block diagram illustrating an embodiment of a distribution circuit provided in the apparatus shown in FIG. 7.

FIG. 11 is a block diagram illustrating an embodiment of the distribution circuit DST provided in the system shown in FIG. 7.

The distribution circuit DST comprises absolute value circuit $ABS_1$ to $ABS_4$, operational amplifiers $OA_1$ to $OA_4$, adder/subtractor circuits $A_1$ to $A_4$, multipliers $ML_1$ to $ML_4$, and analog switch circuits $AS_1$ to $AS_4$. The output $I_{OT}^*$ of the reactive power control compensative circuit HQ shown in FIG. 1 and peak values $I_{mA}^*$, $I_{mB}^*$, $I_{mC}^*$ and $I_{mD}^*$ of load current commands delivered to the respective cycloconverters CC-A, CC-B, CC-C and CC-D are input to the distribution circuit DST. Namely, U-, V- and W-phase load current command values of the cycloconverter CC-A are expressed as follows:

$$I_U^* = I_{mA}^* \cdot \sin \omega t,$$

$$I_V^* = I = I_{mA}^* \cdot \sin(\omega t - 2\pi/3), \text{ and}$$

$$I_W^* = I_{mA}^* \cdot \sin(\omega t + 2\pi/3)$$

where $\omega$ is an output angular frequency.

The circulating current command $I_{OA}^*$ delivered to the cycloconverter CC-A is determined as follows.

The peak value $I_{mA}^*$ of the load current command is input to the absolute value circuit $ABS_1$. As a result, the absolute value $|I_{mA}^*|/I_{MA}$ thus obtained is input to the adder/subtractor circuit $A_1$. Thus, $1-(|I_{mA}^*|/I_{MA})$ is produced therefrom.

The output thus obtained of the adder/subsractor circuit $A_1$ is input to the multiplier $ML_1$, and then is multiplied by the output signal $I_{OT}^*$ of the above-mentioned reactive power control compensative circuit HQ. Thus, the circulating current command $I_{OA}^*$ expressed below is obrained:

$$I_O^* = I_{OT}^* \times (1 - |I_{mA}|/I_{MA}),$$

where a value $I_{MA}$ is set at the maximum value of the peak value $I_{MA}^*$ of the load current command or a value slightly larger than the maximum value thereof.

Further, circulating current commands $I_{OB}^*$, $I_{OC}^*$ and $I_{OD}^*$ of other cycloconverters CC-B, CC-C and CC-D are given as follows:

$$I_{OB}^* = I_{OT}^* \times (1 - |I_{mB}^*|/I_{MB}),$$

$$I_{OC}^* = I_{OT}^* \times (1 - |I_{mC}^*|/I_{MD}), \text{ and}$$

$$I_{OD}^* = I_{OT}^* \times (1 - |I_{mD}^*|/I_{MD}).$$

Accordingly, e.g. in the case where the cycloconverter CC-A operates under a light load condition and other cycloconverters operate under heavy load conditions, the absolute value $|I_{mA}^*|$ becomes considerably small as compared to the value $I_{MA}$. As a result, a large value of the circulating current command $I_{OA}^*$ is delivered to the cycloconverter CC-A. At this time, peak values of load currents of other cycloconverters are expressed as $|I_{mB}^*| \approx I_{MB}$, $|I_{mC}^*| \approx I_{MC}$ and $|I_{mD}^*| = I_{MD}$, respectively. As a result, circulating current commands $I_{OB}^*$, $I_{OC}^*$ and $I_{OD}^*$ become small.

Namely, by flowing much circulating current in a cycloconverter under a light load condition and by flowing less circulating current in respective cycloconverters under heavy load conditions, a control of the total reactive power $Q_T$ is carried out. Accordingly, it is sufficient to flow a small circulating current in the cycloconverter under the heavy load, thus making it possible to prevent current capacity of a converter from increasing.

Analog switches $AS_1$ to $AS_4$ are provided for individually setting the respective circulating current commands $I_{OA}^*$, $I_{OB}^*$, $I_{OC}^*$ and $I_{OD}^*$ at zero when an operation of each cycloconverter is stopped, i.e., a gate interruption occurs.

Figure 12:
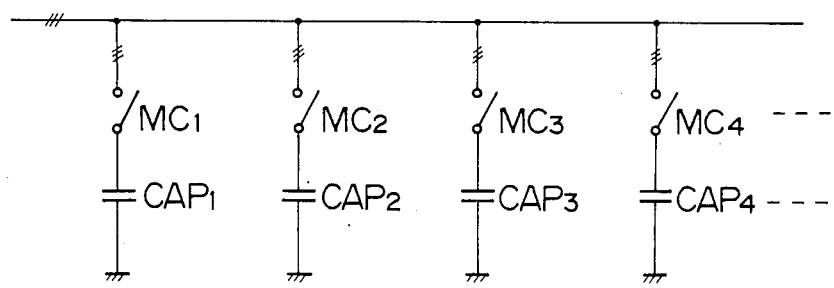
FIG. 12 is a block diagram illustrating an embodiment of a main circuit for a power factor compensating capacitor provided in the apparatus shown in FIG. 7.

FIG. 12 is a schematic view showing an example of a power factor compensating capacitor CAP connected at a receiving-end wherein the capacitor CAP is divided into three-phase distributed capacitors $CAP_1$, $CAP_2$, ... corresponding to a large number of stages. By operating switches $MC_1$, $MC_2$, ... provided in the respective stages, the number of distributed capacitors connected can be switched.

Figure 13:
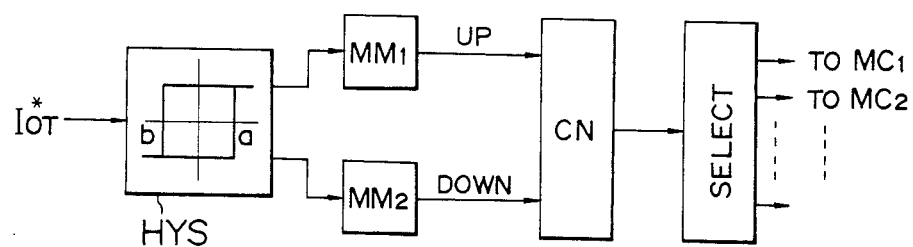
FIG. 13 is a block diagram illustrating an embodiment of a switching control circuit for the power factor compensating capacitor provided in the apparatus shown in FIG. 7.

FIG. 13 is a block diagram illustrating an example of a switching control circuit for controlling the switches $MC_1$, $MC_2$, ... shown in FIG. 12. The switching control circuit comprises a hysteresis circuit HYS, monostable multivibrator circuits (which will be referred hereinafter as monomulti) $MM_1$ and $MM_2$, an up/down counter CN, and a select or circuit SELECT.

The output signal $I_{OT}^*$ of the reactive power control compensative circuit HQ provided in the system shown in FIG. 7 is input to the hysteresis circuit HYS. When the output signal $I_{OT}^*$ increases to exceed an upper limit a of the hysteresis, a rising pulse occurs to trigger the monomulti $MM_1$. By an output signal of the monomulti $MM_1$, a counted value of the counter CN is incremented by one. In response to the output of the counter CN, the selector circuit SELECT produces an output for decreasing the number of the distributed capacitors connected to power compensating capacitor CAP by one. When the capacity of the capacitor CAP is decreased, the reactive power $Q_T$ at the receiving-end lags to decrease the output signal $I_{OT}^*$ of the reactive power control compensative circuit HQ. In this instance, the capacity to be reduced is determined to such an extent that the output signal $I_{OT}^*$ reaches a lower limit b.

In contrast, where the cycloconverter is operated under a heavy load condition, with the result that the output signal $I_{OT}^*$ is decreased to a value below the lower limit b of the hysteresis, a falling pulse is delivered to the monomulti $MM_2$ to trigger it, thus decreasing a counted value of the counter by one. In response to the output from the monomulti $MM_2$, the selector circuit SELECT produces an output for increasing the number of distributed capacitors connected to the power factor compensating capacitor by one.

Figure 14:
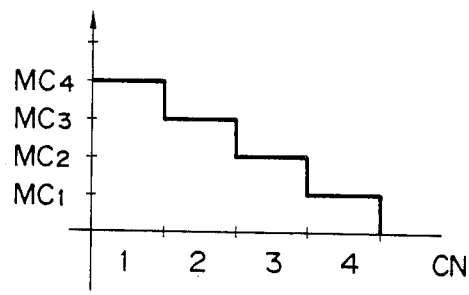
FIG. 14 is an explanatory view showing the operation of the circuit shown in FIG. 13.

FIG. 14 shows the relationship between a counted value of the counter CN and the number of the switches $MC_1$ to $MC_4$ closed where the power factor compensating capacitor CAP is divided into four stages. By controlling the number of the distributed capacitors connected to the power factor compensating capacitor CAP depending upon the magnitude of the circulating current command value $I_{OT}^*$, advantages can be expected. Namely, the employment of such a control maintains values of circulating currents flowing in respective cycloconverter that are not small, particularly under a light load condition, and reduces not only loss in converters but also loss in power transformers or dc reactors, thus improving the operation efficiency of the entirety of the system.

Modifications

It is needless to say that the present invention can be practiced by using circulating current type cycloconverters in a delta-connection as disclosed in the Japanese Patent Publication No. 58-60328 issued to Tokkaisho. The total reactive power control circuit TQC shown in FIG. 3 is configured so that the operational amplifiers $G_1, G_2, \ldots G_n$ for distribution are provided at the preceding stage and the limiter circuits $LM_1, LM_2, \ldots LM_n$ and the adders $AD_1, AD_2, \ldots AD_n$ are provided at the subsequent stage. Instead of such configuration, the reciprocal arrangement may be employed. Namely, the limiter circuits and the adders and the operational amplifiers for distribution $G_1, G_2, \ldots G_n$ are provided at the subsequent stage. In such a case, it is sufficient to provide one limiter circuit and one adder.

Further, it is needless to say that the operating system according to the present invention can be operated in the same manner even if a non-circulating current type cycloconverter is included in a plurality of cycloconverters.

As stated above, the following advantages with the system according to the present invention can be expected.

(1) It is sufficient to collectively provide capacitors constituting the power factor compensating capacitor at the receiving-end, thus making it possible to decrease both the amount of wiring and the area required for the wiring.

(2) Even when there is a gate interruption in one or some cycloconverters due to failure, the reactive power at the receiving-end can be controlled by other normal cycloconverters in a continuous manner, thus suppressing the influence on the power system as little as possible.

(3) The capacity of the power factor compensating capacitor connected at the receiving-end can be selected as an optimum value by taking into account the operating mode of a plurality of cycloconverters, thus reducing the capacity.

(4) There is no possibility that an unnecessary circulating curren will flow, thus making it possible to reduce the capacity of power transformers or converters.

(5) It is possible to operate a plurality of cycloconverters with a high efficiency at the same time.

(6) Where the sum of a lagging reactive power of the entirety of the cycloconverter system exceed the capacity of the power factor compensating capacitor due to an overload operation, a control is conducted to maintain circulating current command values delivered to the respective cycloconverters at fixed values unequal to zero, thus always realizing an operation without losing the characteristic of the circulating current type cycloconverter.

(7) Where circulating currents in respective cycloconverters are increased under the condition of a light load operation, a control is effected to decrease the number of distributed capacitors connected of the power factor compensating capacitor depending upon the magnitude of the circulating current command value, thus improving the operation efficiency.

(8) Where respective cycloconverters are individually operated under a light load condition or under a heavy load condition, a distribution control is carried out to circulate current in the cycloconverters operated under the light load condition and to circulate less current in the cycloconverters operated under the heavy load condition, thus making it possible to prevent the current capacity of the converter from being increased.

What is claimed is:

1. An apparatus for operating cycloconverters in a parallel fashion comprising:
   (a) an ac power supply,
   (b) a plurality of circulating current type cycloconverters connected in parallel to said ac power supply,
   (c) a plurality of loads receiving power from said respective cycloconverters,
   (d) a power factor compensating capacitor assembly comprising a plurality of capacitors collectively connected at a receiving end of said ac power supply,
   (e) means for controlling output currents of said respective cycloconverters,
   (f) means for controlling circulating currents of said respective cycloconverters, and
   (g) means for delivering circulating current command values to said means for controlling the circulating currents of said respective cycloconverters for controlling a total reactive power of said receiving end of said ac power supply.

2. An apparatus as set forth in claim 1, wherein said circulating current command valves are delivered to said means for controlling the circulating currents of said respective cycloconverters and wherein said circulating current command values are distributed depending upon the peak values of said output current of said respective cycloconverter.

3. An apparatus as set forth in claim 1, wherein said power factor compensating capacitor assembly is divided into a large number of stage capacitors to control the number of the stage capacitors connected to said power factor compensating capacitor assembly depending upon the magnitude of said circulating current command value.

4. An apparatus for operating cycloconverters in a parallel fashion comprising:
   (a) an ac power supply,
   (b) a plurality of circulating current type cycloconverters connected in parallel to said ac power supply,
   (c) a plurality of loads receiving power from said respective cycloconverters,
   (d) a power factor compensating capacitor assembly comprising a plurality of capacitors collectively connected at a receiving end of said ac power supply,
   (e) means for controlling output currents of said respective cycloconverters,
   (f) means for controlling circulating currents of said respective cycloconverters,
   (g) means for delivering circulating current command values to said means for controlling the circulating currents of said respective cycloconverters for controlling a total reactive power at said receiving end of said ac power supply, and
   (h) means for maintaining each of said circulating current command values above a minimum value.

5. An apparatus as set forth in claim 4, wherein said circulating current command values are delivered to said means for controlling the circulating currents of said respective cycloconverters and wherein said circulating current command values are distributed depending upon the peal values of said output currents of said respective cycloconverter.

6. An apparatus as set forth in claim 4, wherein said power factor compensating assembly is divided into a large number of stage capacitors to control the number of the stage capacitors connected to said power factor compensating capacitor assembly depending upon the magnitude of said circulating current command value.

7. An apparatus as set forth in claim 2, wherein said circulating current command values are delivered to said means for controlling the circulating current of said respective cycloconverters and wherein said circulating command values are distributed to increase the flow of circulating current in the cycloconverters operating under a light load condition and to decrease the flow of circulating current in the cycloconverters operating under a heavy load condition, depending upon the peak values of said output currents of said respective cycloconverters.

8. An apparatus as set forth in claim 3, wherein the number of stage capacitors connected to said power factor compensating capacitor assembly is decreased or increased according to the increase or decrease, respectively of said circulating current command value.

9. An apparatus as set forth in claim 8, further including:
   a hysteresis circuit for detecting when the increase of said circulating current command value is more than a first predetermined limit and when the decrease thereof is lower than a second predetermined limit; and
   a counter for counting an increase or decrease in the output of said hysteresis circuit according to the increase or decrease of said circulating current command value, thereby decreasing or increasing, respectively, the number of said stage capacitors according to the output of said counter.

10. An apparatus as set forth in claim 4, wherein said circulating current command values are delivered to said means for controlling the circulating current of said respective cycloconverters and wherein said circulating command values are distributed to increase the flow of circulating current in the cycloconverters operating under a light load condition and to decrease the flow of circulating current in the cycloconverters operating under a heavy load condition, depending upon the peak values of said output currents of said respective cycloconverters.

11. An apparatus as set forth in claim 6, wherein the number of stage capacitors connected to said power factor compensating capacitor assembly is decreased or increased according to the increase or decrease, respectively, of said circulating current command value.

12. An apparatus as set forth in claim 11, further including:
   a hysteresis circuit for detecting when the increase of said circulating current command value is more than a first predetermined limit and when the decrease thereof is lower than a second predetermined limit; and
   a counter for counting an increase or decrease in the output of said hysteresis circuit according to the increase or decrease of said circulating current command value, thereby decreasing or increasing, respectively, the number of said stage capacitors according to the output of said counter.

* * * * *

UNITED STATES PATENT AND TRADEMARK OFFICE
CERTIFICATE OF CORRECTION

PATENT NO. : 4,673,823

DATED : June 16, 1987

INVENTOR(S) : Shigeru TANAKA

It is certified that error appears in the above—identified patent and that said Letters Patent is hereby corrected as shown below:

On the Title Page, Item [73] "E. I. Du Pont de Nemours and Company, Wilmington, Del." should read -- Kabushiki Kaisha Toshiba, Kawasaki-shi, Japan --.

Signed and Sealed this

Sixteenth Day of February, 1988

Attest:

DONALD J. QUIGG

*Attesting Officer*　　　　　*Commissioner of Patents and Trademarks*